Aug. 10, 1926.
B. OLSON
MILK AERATOR
Filed Oct. 7, 1925
1,595,684
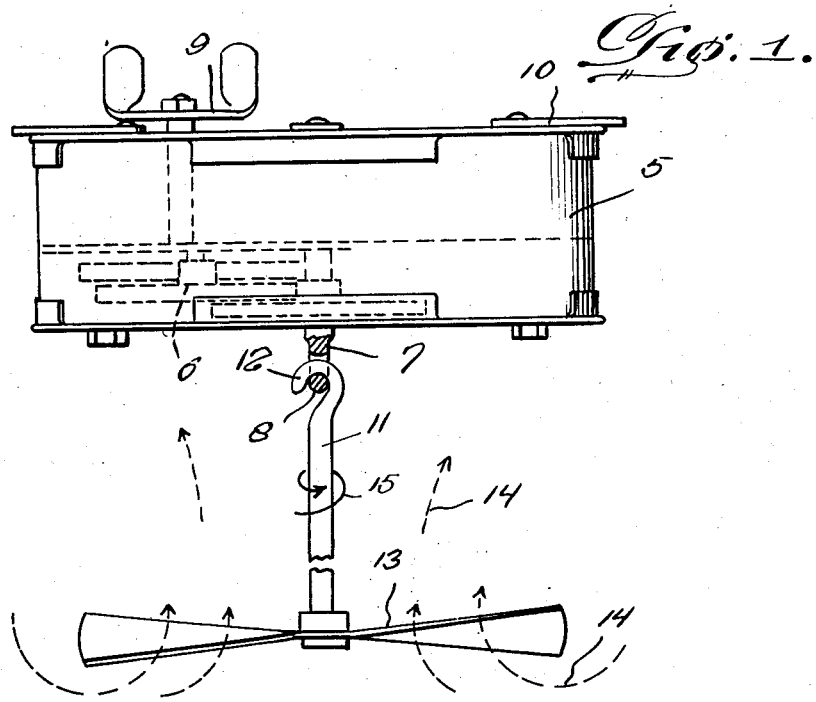
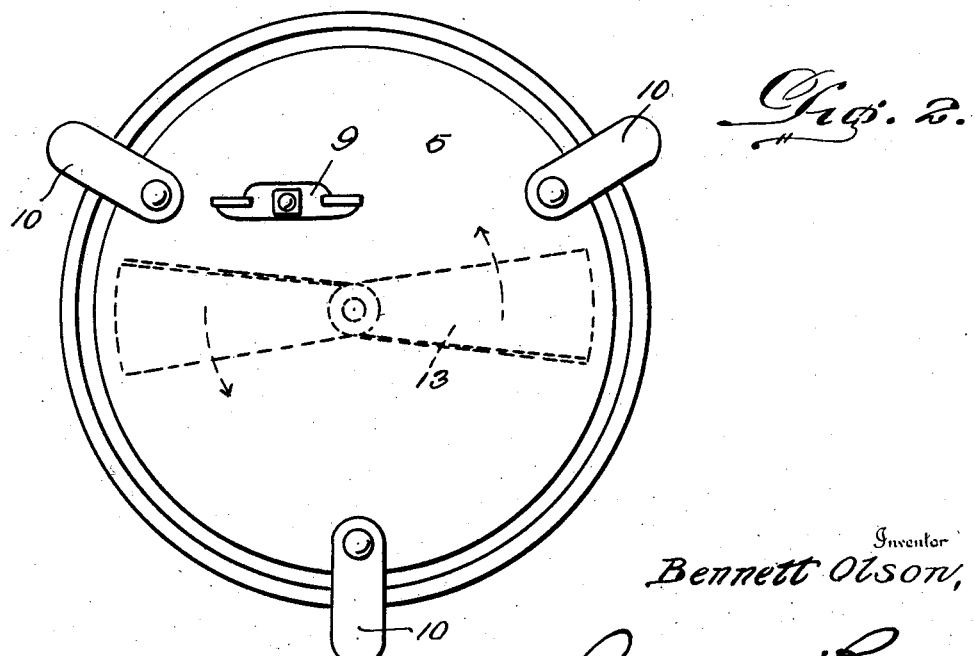
Inventor
Bennett Olson,
By Clarence A. O'Brien
Attorney Patented Aug. 10, 1926.

1,595,684

UNITED STATES PATENT OFFICE.

BENNETT OLSON, OF BARRETT, MINNESOTA.

MILK AERATOR.

Application filed October 7, 1925. Serial No. 61,089.

The present invention relates to a milk aerator, and has for its principal object to provide a machine for stirring and agitating milk so as to thoroughly aerate the same for the purpose of removing from the milk the animal heat therein.

Another very important object of the invention is to provide a machine of this nature which is exceedingly simple in its construction consisting merely of a casing housing a spring motor, and having extended therefrom a driven shaft which may be engaged with a propeller shaft.

Another important object of the invention is to provide a device of this nature which may be supported on the upper edge of a bucket or like container while the propeller or agitator is in operation.

A still further very important object of the invention is to provide a device of this nature which is inexpensive to manufacture, easily manipulated, light, compact, strong, durable, efficient, reliable, not likely to easily become out of order, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is a side elevation of the machine embodying the features of my invention, and Figure 2 is a top plan view thereof.

Referring to the drawing in detail, it will be seen that 5 designates a casing having mounted therein a conventional form of spring motor 6 which is operatively associated with a driven shaft 7 extending through the bottom of the casing and terminating at its outer end in an eye or loop 8. The spring motor 6 is windable by means of key 9. On the top of the motor housing or casing 5, there is pivoted a plurality of bars 10 which may be swung to extend outwardly beyond the periphery of the casing as is shown in Figure 2 in order that the casing may be supported inside the bucket while the bars are engaged to extend over the edge thereof. A propeller shaft 11 is provided at one end with a hook 12 engageable with the eye 8. A propeller 13 is mounted at the other end of the propeller shaft 11, and functions as an agitator. The propeller 13 has its blades pitched so as to tend to draw the milk upwardly from the bottom of the bucket as is indicated by the arrows 14, and the shaft 11 is adapted to rotate in the direction indicated by the arrow 15, and consequently the propeller shaft 11 is maintained in axial alignment with the shaft 7.

It is thought that the construction, operation, and advantages of the invention will now be clearly understood without a more detailed description thereof. It is desired to point out that the shaft 11 is easily and quickly detachable from the shaft 7 so that the shaft 11 and propeller 13 may be thoroughly cleaned. Thus the device is highly sanitary. The device also possesses an exceedingly simple construction and consequently can be manufactured at a very low cost, yet the device is very strong and durable and has no likelihood of becoming very easily out of order. The structure is exceedingly compact and is capable of being readily supported in a bucket in the proper manner for allowing the shaft 11 to depend down into the bucket so that the agitating propeller 13 may be operated properly.

The present embodiment of the invention has been disclosed merely by way of example since in actual practice it attains the features of advantage enumerated as desirable in the statement of the invention and the above description. It will be apparent that numerous changes in the details of construction, and in the combination and arrangement of parts may be resorted to without departing from the spirit or scope of the invention as hereinafter claimed or sacrificing any of its advantages.

Having thus described the invention, what I claim as new is:—

In combination, a casing, a prime mover in the casing, a shaft operatively associated with the prime mover and extending from the casing and terminating exteriorly of the casing in an eye, a shaft terminating in a hook engageable with said eye, an agitating unit on said second shaft including a pair of blades having a pitch so that the rotation of the first shaft causes the agitating unit to tend to rotate in a liquid to pull the second shaft from the first shaft thereby tending to maintain the second shaft in alinement with the first shaft, and a plurality of bars projected from the top of the casing beyond the periphery thereof and adapted to rest on the upper edge of a container.

In testimony whereof I affix my signature.

BENNETT OLSON.